(12) United States Patent
Godard et al.

(10) Patent No.: US 9,524,163 B2
(45) Date of Patent: Dec. 20, 2016

(54) COMPUTER PROCESSOR EMPLOYING HARDWARE-BASED POINTER PROCESSING

(71) Applicant: Mill Computing, Inc., Palo Alto, CA (US)

(72) Inventors: Roger Rawson Godard, East Palo Alto, CA (US); Arthur David Kahlich, Sunnyvale, CA (US)

(73) Assignee: Mill Computing, Inc., Palo Alto, CA (US)

( * ) Notice: Subject to any disclaimer, the term of this patent is extended or adjusted under 35 U.S.C. 154(b) by 171 days.

(21) Appl. No.: 14/515,087

(22) Filed: Oct. 15, 2014

(65) Prior Publication Data
US 2015/0106588 A1 Apr. 16, 2015

Related U.S. Application Data

(60) Provisional application No. 61/890,891, filed on Oct. 15, 2013.

(51) Int. Cl.
*G06F 12/02* (2006.01)
*G06F 9/30* (2006.01)
(Continued)

(52) U.S. Cl.
CPC ....... *G06F 9/30032* (2013.01); *G06F 9/30145* (2013.01); *G06F 12/0292* (2013.01); *G06F 12/0811* (2013.01); *G06F 12/0864* (2013.01); *G06F 12/0893* (2013.01); *G06F 12/1027* (2013.01); *G06F 12/0897* (2013.01); *G06F 12/1009* (2013.01); *G06F 17/30286* (2013.01); *G06F 2212/1024* (2013.01); *G06F 2212/1028* (2013.01); *G06F 2212/283* (2013.01); *G06F 2212/608* (2013.01);
(Continued)

(58) Field of Classification Search
CPC ...... G06F 17/30286; G06F 3/067; G06F 9/35; G06F 3/0383; H04L 29/08549
See application file for complete search history.

(56) References Cited

U.S. PATENT DOCUMENTS 5,321,837 A 6/1994 Daniel et al.
5,465,335 A 11/1995 Anderson
(Continued)

FOREIGN PATENT DOCUMENTS

WO WO 97/24671 7/1997

*Primary Examiner* — Ryan Bertram
*Assistant Examiner* — Trang Ta
(74) *Attorney, Agent, or Firm* — Gordon & Jacobson, P.C.

(57) ABSTRACT

A computer processor is provided with execution logic that performs operations that utilize pointers stored in memory. In one aspect, each pointer is associated with a predefined number of event bits. The execution logic processes the event bits of a given pointer in conjunction with processing a predefined pointer-related operation involving the given pointer in order to selectively output an event-of-interest signal.

In another aspect, each pointer is represented by an address field and a granularity field. The address field includes a chunk address and an offset. The granularity field represents granularity of the offset of the address field. The execution logic includes an address derivation unit that processes the granularity field of a base address for a given pointer in order to generate a valid address field for the derived pointer.

23 Claims, 8 Drawing Sheets

(51) Int. Cl.
*G06F 12/08* (2016.01)
*G06F 12/10* (2016.01)
*G06F 17/30* (2006.01)

(52) U.S. Cl.
CPC ............ *G06F 2212/6032* (2013.04); *G06F 2212/684* (2013.01); *Y02B 60/1225* (2013.01)

(56) References Cited

U.S. PATENT DOCUMENTS

| | | | | |
|---|---|---|---|---|
| 5,920,876 | A * | 7/1999 | Ungar | G06F 9/4435 |
| 5,978,895 | A * | 11/1999 | Ogletree | G06F 9/3001 |
| | | | | 711/214 |
| 6,349,377 | B1 * | 2/2002 | Lindwer | G06F 9/30174 |
| | | | | 712/22 |
| 6,766,284 | B2 * | 7/2004 | Finch | G06F 8/447 |
| | | | | 703/13 |
| 7,853,591 | B1 * | 12/2010 | Yang | G06F 17/30289 |
| | | | | 707/736 |
| 2003/0163645 | A1 * | 8/2003 | Tremblay | G06F 9/383 |
| | | | | 711/137 |
| 2004/0034858 | A1 * | 2/2004 | Kushlis | G06F 9/30043 |
| | | | | 718/108 |
| 2008/0273400 | A1 * | 11/2008 | La Rosa | G11C 16/102 |
| | | | | 365/185.29 |
| 2009/0327332 | A1 * | 12/2009 | Moyer | G06F 9/30036 |
| 2013/0007073 | A1 * | 1/2013 | Varma | G06F 12/0253 |
| | | | | 707/813 |
| 2014/0372731 | A1 * | 12/2014 | Nystad | G06F 9/3802 |
| | | | | 712/207 |

* cited by examiner

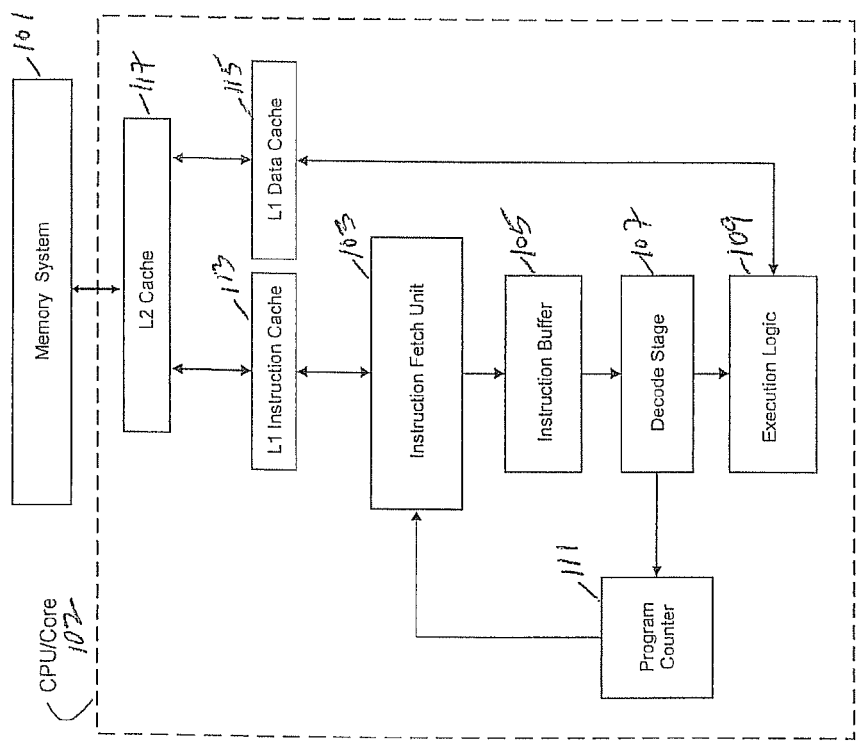
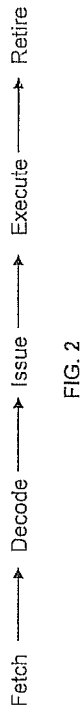
FIG. 1
FIG. 2

COMPUTER PROCESSOR EMPLOYING HARDWARE-BASED POINTER PROCESSING

CROSS-REFERENCE TO RELATED APPLICATIONS

The present disclosure claims priority from U.S. Provisional Patent Appl. No. 61/890,891, filed on Oct. 15, 2013, entitled "Cache Support for a Computer Processor," herein incorporated by reference in its entirety.

BACKGROUND

1. Field

The present disclosure relates to computer processing systems.

2. State of the Art

A computer processor (and the program which it executes) needs places to put data for later reference. A computer processor design will typically have many such places, each with its own trade off of capacity, speed of access, and cost. Usually these are arranged in a hierarchal manner referred to as the memory system of the processor, with small, fast, costly places used for short lived and/or frequently used small data and large, slow and cheap places used for what doesn't fit in the small, fast, costly places. The memory system typically includes the following components arranged in order of decreasing speed of access:

- register file or other form of fast operand storage;
- one or more levels of cache memory (one or more levels of the cache memory can be integrated with the processor (on-chip cache) or separate from the processor (off-chip cache);
- main memory (or physical memory), which is typically implemented by DRAM memory and/or NVRAM memory and/or ROM;
- controller card memory; and
- on-line mass storage (typically implemented by one or more hard disk drives).

In many computer processors, the main memory of the memory system can take several hundred machine cycles to access. The cache memory, which is much smaller and more expensive but with faster access as compared to the main memory, is used to keep copies of data that resides in the main memory. If a reference finds the desired data in the cache (a cache hit) it can access it in a few cycles instead of several hundred when it doesn't (a cache miss). Because a program typically cannot do anything while waiting to access data in memory, using a cache and making sure that desired data is copied into the cache can provide significant improvements in performance.

The address space of the program can employ virtual memory, which provides for two different purposes in modern processors. One purpose, known as paging, permits the totality of the virtual memory address spaces used by all programs to exceed the capacity of the physical address space of the main memory attached to the processor. The other purpose, known as address extension, permits the totality of the virtual address spaces used by all programs to exceed the address space supported by the processor.

A pointer is a primitive, the value of which is intended to be used as a memory address. A pointer points to a datum in the memory system when the pointer's value is the datum's memory address. More generally, a pointer is a kind of reference, and it is said that a pointer references a datum stored somewhere in the memory system. To obtain that datum is to dereference the pointer.

Pointers are used in setting up data structures like lists, queues and trees, typically helping to manage how the data structure is implemented and controlled. Common examples of pointers are start pointers, end pointers, and stack pointers. These pointers can either be absolute (the actual physical address or a virtual address in virtual memory) or relative (an offset from an absolute start address or "base").

Processing pointers can lead to complexities that can degrade performance, particular in modern computer processing systems that employ garbage collectors that automatically move data in the memory system. Furthermore, pointers can also be the source for wild-address bugs that can lead to unwanted faults and possibly system crashes.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor with execution logic that performs operations that utilize pointers to access data stored in a memory system operably coupled to the computer processor. Each such pointer is associated with a predefined number of event bits that constitute metadata. The execution logic is configured to process the event bits of a given pointer in conjunction with the processing of a predefined memory-related operation that involves the given pointer in order to selectively output an event-of-interest signal that provides an indication that an event-of-interest has occurred.

In one embodiment, the execution logic includes at least one mask register that corresponds to a predefined class of memory-related operations. The mask register includes a number of interest bits whose values represent whether a possible event would be of interest if it did occur. The event bits of the given pointer can be used to generate an index into the mask register. The index can be used to access and select a corresponding interest bit of the mask register and then process the selected interest bit in order to selectively output the event-of-interest signal based upon the value of the selected interest bit.

In another embodiment, the execution logic includes a plurality of mask registers that correspond to different predefined classes of memory-related operations. Each mask register includes a number of interest bits whose values represent whether a possible event would be of interest if it did occur. The event bits of the given pointer can be used to generate an index into a particular mask register, wherein the particular mask register corresponds to the memory-related operation that involves the given pointer. The index can be used to access and select a corresponding interest bit of the particular mask register and then process the selected interest bit in order to selectively output the event-of-interest signal based upon the value of the selected interest bit.

The execution logic can include an update interest mask register that corresponds to a predefined class of pointer-related operations that store a pointer value to memory. The update interest mask register includes a number of interest bits whose values represent whether a possible event would be of interest if it did occur. The event bits of the given pointer that provides the address being stored to, and the event bits of pointer being stored, can be concatenated to generate an index into the update interest mask register. The index can be used to access and select a corresponding interest bit of the update interest mask register and then process the selected interest bit in order to selectively output the event-of-interest signal based upon the value of the selected interest bit. The event bits of the pointer that provides the address being stored to can define the most-significant bits of the concatenated result that forms the index, and the event bits of the pointer being stored can define the least-significant bits of the concatenated result that forms the index, or vice versa. The concatenated bits of the result can be treated as an integer value which forms the index. The instruction set architecture of the computer processor can semantically define the class of pointer-related operations that modify a pointer in a manner that distinguishes such operations from store operations for storing an ordinary non-pointer data operand in memory.

In order to support a garbage collecting scheme involve multiple regions of memory, the event bits of each respective pointer can be updated to track the particular region of memory to which the respective pointer references.

The execution logic can also include a read interest mask register that corresponds to a predefined class of pointer-related operations that read memory through a pointer. The read interest mask register includes a number of interest bits whose values represent whether a possible event would be of interest if it did occur. The execution logic can also include a write interest mask register that corresponds to a pre-defined class of pointer-related operations that write memory through a pointer. The write interest mask register includes a number of interest bits whose values represent whether a possible event would be of interest if it did occur.

In another aspect a computer processor is provided with execution logic that performs operations that utilize pointers to access data stored in a memory system operably coupled to the computer processor. Each pointer is represented by an address field and a granularity field. The address field includes a chunk address and an offset. The granularity field represents the granularity of the offset of the address field. The execution logic includes an address derivation unit that processes the granularity field of a base address for a given pointer in order to validate an address-arithmetic operation operating upon the given pointer. The address derivation unit can process the granularity field of the base address of the given pointer to identify the offset field of the address field for the given pointer.

In one embodiment, the address derivation unit can check for an offset part overflow condition when offsetting the address field for the given pointer. The offset part overflow condition occurs when the chunk field of the given pointer differs from the chunk field of the offsetted address. The address derivation unit can output a valid effective address in the event that the offset part overflow condition is not detected. The address derivation unit can output a fail signal in the event that the offset part overflow condition is detected.

The instruction set architecture of the computer processor semantically defines a class of operations that utilize the address derivation unit to derive a pointer. Such class of operations include pointer-increment operations, pointer-decrement operations, pointer indexing operations, pointer comparison operations, and pointer difference operations. The class can also include such operations that are implicit in the address modes used in memory reference operations such as loads and stores.

It is contemplated that the computer processor can support at least one predefined operation that updates the granularity field of a respective pointer (for example, by decrementing and/or possibly increments the granularity field).

BRIEF DESCRIPTION OF THE DRAWINGS

FIG. 1 is a schematic block diagram of a computer processing system according to an embodiment of the present disclosure.

FIG. 2 is a schematic diagram of exemplary pipeline of processing stages that can be embodiment by the computer processor of FIG. 1.

DETAILED DESCRIPTION OF THE PREFERRED EMBODIMENTS

Figure 3:
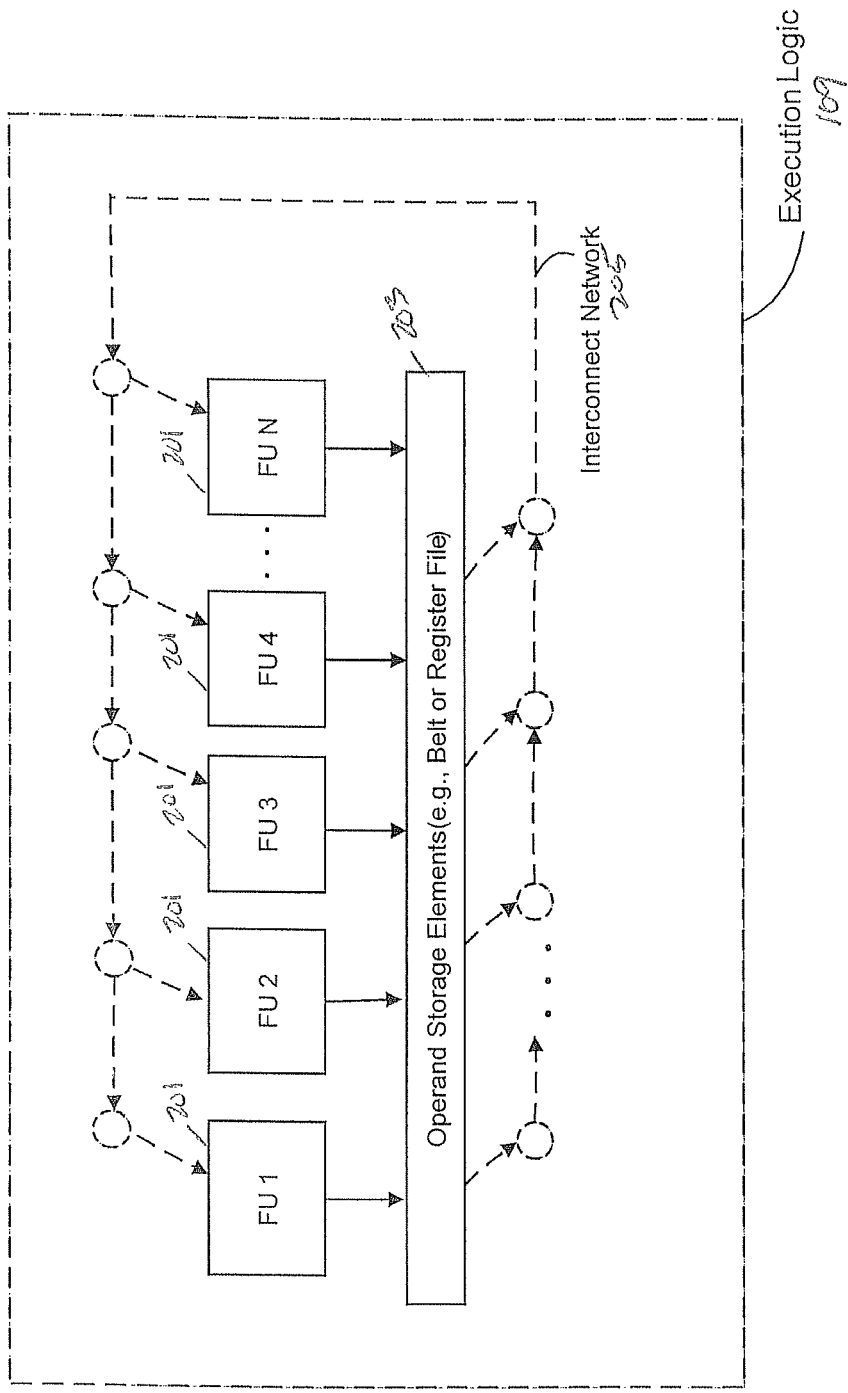
FIG. 3 is schematic illustration of components that can be part of the execution logic of the computer processor of FIG. 1 according to an embodiment of the present disclosure.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is logically organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

In accordance with the present disclosure, a sequence of instructions is stored in a hierarchical memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution logic 109 that are arranged in a pipeline manner as shown. The CPU (or Core) 102 also includes at least one program counter (one shown as 111), at least one L1 instruction cache (one shown as 113), an L1 data cache 115 and a shared instruction/data L2 Cache 117.

The L1 instruction cache 113, the L1 data cache 115 and the L2 cache are logically part of the hierarchical memory system 101. The L1 instruction cache 113 is a cache memory that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache memory that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The shared L2 Cache 117 stores both instructions and data. The L2 cache 117 can be organized as a set-associative cache structure, a fully associative cache structure, or a direct mapped cache structure as is well known in the art. The hierarchy of the memory system 201 can also include additional levels of cache memory, such as a level 3 cache, as well as main memory. One or more of these additional levels of the cache memory can be integrated with the CPU 102 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing lower levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer 105 for storage therein.

The decode stage 107 is configured to decode one or more instructions stored in the instruction buffer 105. Such decoding generally involves parsing and decoding the bits of the instruction to determine the type of operation(s) encoded by the instruction and generate control signals required for execution of the operation(s) encoded by the instruction by the execution logic 109.

The execution logic 109 utilizes the results of the decode stage 107 to execute the operation(s) encoded by the instructions. The execution logic 109 can send a load request to the L1 data cache 115 to fetch data from the L1 data cache 115 at a specified memory address. The L1 data cache 115 services this load request (possibly accessing the L2 cache 117 and lower levels of the memory system 101 if missed in the L1 data cache 115), and supplies the requested data to the execution logic 109. The execution logic 109 can also send a store request to the L1 data cache 115 to store data into the memory system at a specified address. The L1 data cache 115 services this store request by storing such data at the specified address (which possibly involves overwriting data stored by the data cache and lowering the stored data to the L2 Cache 117 and lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution logic 109.

In the issue stage, one or more operations as decoded by the decode stage are issued to the execution logic 109 and begin execution.

In the execute stage, issued operations are executed by the functional units of the execution logic 109 of the CPU/Core 102.

In the retire stage, the results of one or more operations produced by the execution logic 109 are stored by the CPU/Core 102 as transient result operands for use by one or more other operations in subsequent issue/execute cycles.

The execution logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

During the execution of an operation by the execution logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

FIG. 3 is a schematic diagram illustrating the architecture of an illustrative embodiment of the execution logic 109 of the CPU/Core 102 of FIG. 1 according to the present disclosure, including a number of functional units 201. The execution logic 109 also includes a set of operand storage elements 203 that are operably coupled to the functional units 201 of the execution logic 109 and configured to store transient operands that are produced and referenced by the functional units of the execution logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

Pointer Event Processing

Figure 4:
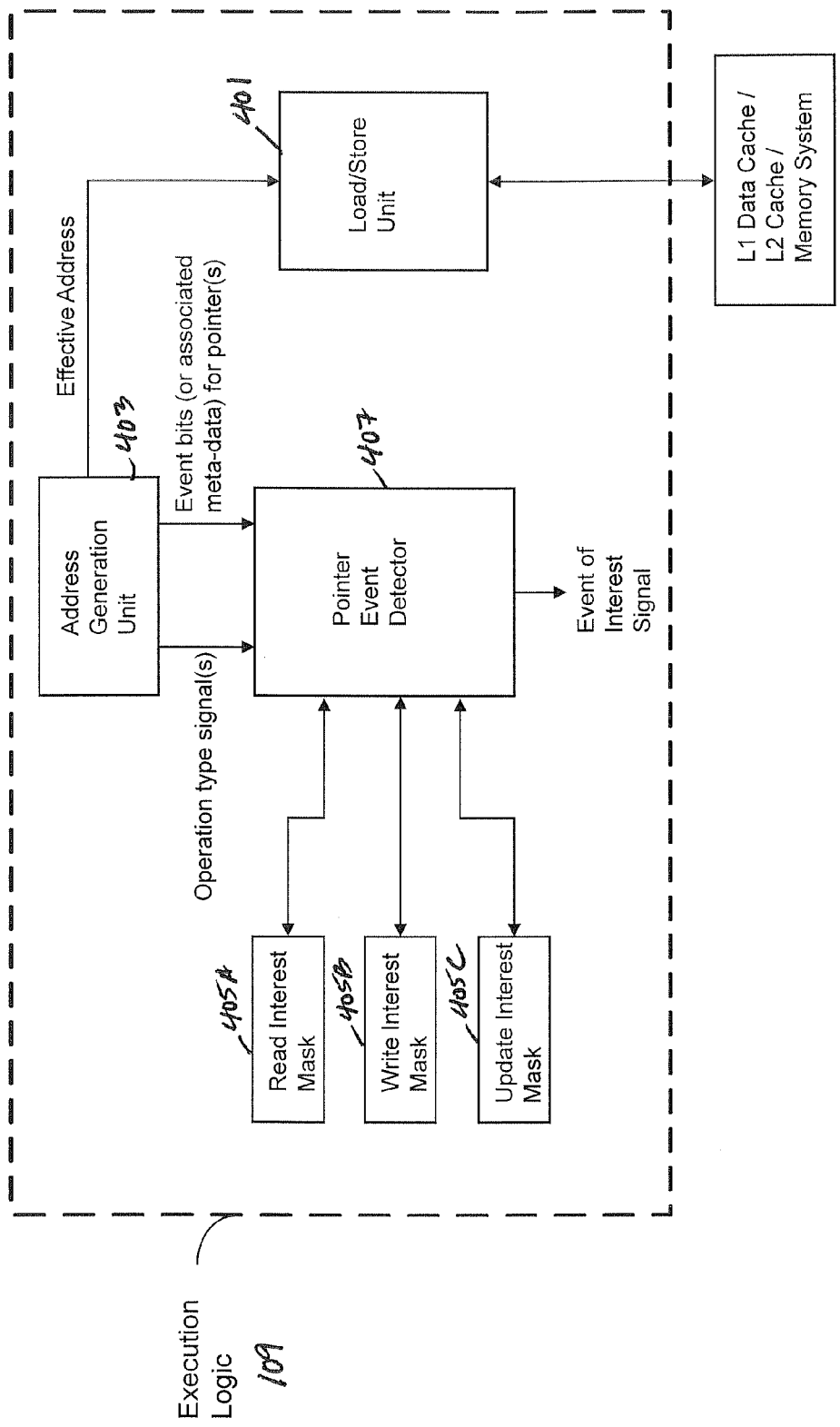
FIG. 4 is schematic illustration of components that can be part of the execution logic of the computer processor of FIG. 1 for carrying out point event detection operations according to an embodiment of the present disclosure.

In one embodiment shown in FIG. 4, the execution logic 109 is adapted to include a hardware block (referred to the "pointer event detector") 407 that functions during operation of the computer processing system in processing certain classes of pointer-related operations to selectively raise an appropriate event-of-interest signal that is communicated to the program being executed. In the context of the embodiment of FIG. 4, the physical representation of each pointer includes a small number of bits (called "event bits") that are associated with the pointer. The event bits may be taken from the bits used as the address of the pointer, thereby reducing the address range of the pointer. Alternatively, the event bits may reside in metadata associated by some means with the respective pointer.

Furthermore, the execution logic 109 of FIG. 4 is configured to maintain three mask registers: a read interest mask register 405A, a write interest mask register 405B, and an update interest mask register 405C as shown.

The three mask registers 405A, 405A, 405C each contain any array of interest bits representing whether a particular combination of event bits is of interest or not. Thus, the bits provide an indication whether a possible event would be of interest if it did occur. The size (the number of interest bits) of each respective mask register depends on the number of reserved event bits, which is referred to as the "event bit count" or "ebc", for the pointers specified by pointer-related operations. In one embodiment, the read interest mask register 405A contains $(2)^{ebc}$ interest bits, the write interest mask register 405B contains $(2)^{ebc}$ interest bits, and the update interest mask 405C contains $(2^{ebc})^2$ interest bits. Thus, for example, if the event bit count is three, then the read interest mask register and the write interest mask both contain $(2)^3$ or eight interest bits and the update interest mask contains $(8)^2$ or sixty-four interest bits.

In this embodiment, the functional units of the execution logic 109 also include at least one load/store unit 401 as shown. Alternatively, the functional units can include one or more dedicated load units and store units as is well known. Load operations are decoded by the decode stage 107 and issued for execution by the load/store unit 401, which issues a load request corresponding to the decoded load operation to the L1 Data Cache 115. The L1 data cache 115 services the load request by returning all (or part) of the requested data that hits in the L1 data cache 115 to the execution logic (for example to a retire station allocated to handle the load request). If the requested data is not found (misses) in L1 data cache 115, the missing part(s) of the requested data are requested from the next level in the memory hierarchy (the L2 cache 117 and then to the memory system) until it is located and returned to the execution logic for storage in the fast operand storage 203 of the execution/retire logic 109. Store operations are decoded by the decode stage 107 and issued for execution by the load/store unit 401, which issues a store request corresponding to the decoded store operation to the L1 Data Cache 115 for storing operand data in the memory system.

Furthermore, the functional units of the execution logic 109 include a pointer address generation unit 403 that is configured to generate effective addresses (i.e., the memory addresses pointed to by respective pointers) that are used by the program(s) executing on the CPU 102. It is contemplated that the address generation unit 403 can be a functional unit dedicated to addressing arithmetic or can possibly perform other integer operations, including integer arithmetic on pointer-sized numbers. In the context of the embodiment of FIG. 4, the need for the specialized pointer processing mandates that the instruction set architecture of the CPU be defined to identify any memory operation that stores a pointer (i.e., that update the memory address pointed to by the respective pointer with a value that is itself a pointer) as distinguished from store operations that store ordinary non-pointer data operands in memory. The semantics of the memory manipulation operation is used to configure the address generation unit 403 such that it is used to generate the effective address for the pointer and simultaneously output the event bits of the pointer address of the given pointer (the address the pointer points to) and, in the case of a store-pointer operation, the event bits of the pointer being stored.

The pointer event detector 407 of FIG. 4 functions during operation of the computer processing system in processing certain classes of memory-related operations to access the three mask registers 405A, 405B, 405C in order to selectively raise an appropriate event-of-interest signal that is communicated to the program being executed by any means suitable to the purpose, such as by a mechanism by which hardware-detected events are communicated by other operations of the processor (for example, by an interrupt signal). Specifically, when the execution logic 109 is executing a load operation for datum referenced by a pointer (a load-thru-pointer operation), the pointer event detector 407 is configured to access the read interest mask register 405A in order to selectively raise an event-of-interest signal. When the execution logic 109 is executing a data store operation to a location referenced by a pointer (a store-thru-pointer operation), the pointer event detector 407 is configured to access the write interest mask register 405B in order to selectively raise an event-of-interest signal. When the execution logic 109 is executing a store operation that stores a pointer to memory (a store-thru-pointer operation), the pointer event detector 407 is configured to access the update interest mask register 405C in order to selectively raise an event-of-interest signal.

The execution of the load-thru-pointer operation and the execution of the store-thru-pointer operation and the execution store-pointer operations is indicted by one or more signals supplied to the pointer event detector 407 by the address generation unit 403 as appropriate. The event bits of the respective pointer that corresponds to such operation(s) is also supplied to the pointer event detector 407 shown in FIG. 4. The execution of the load-thru-pointer operation can be detected by checking the addressing mode that is used to generate the address for each load request in order to determine if the addressing mode corresponds to a pointer address. In this case, the load request is dereferencing the corresponding pointer in order to load the datum pointed to by the pointer. Similarly, the execution of the store-thru-pointer operation can be detected by checking the addressing mode that is used to generate the address for each store request in order to determine if the addressing mode corresponds to a pointer address. In this case, the store request is dereferencing the corresponding pointer in order to store datum pointed to by the pointer.

The execution of a store-pointer operation is indicted by one or more signals supplied to the pointer event detector 407 by the address generation unit 403 as appropriate. The event bits of the pointer address being written to and the event bits of the pointer being written are output from the address generation unit 403 to the pointer event detector 407. The execution of the store-pointer operation is detected by decoding operations according to the semantics assigned to the store-pointer operation as defined by the instruction set architecture of the computer processor. In this manner, the semantics assigned to the store-pointer operation distinguishes the store-pointer operation from a store operation that is used to store non-pointer values to memory and is used to configure the address generation unit 403 appropriately.

Figure 5:
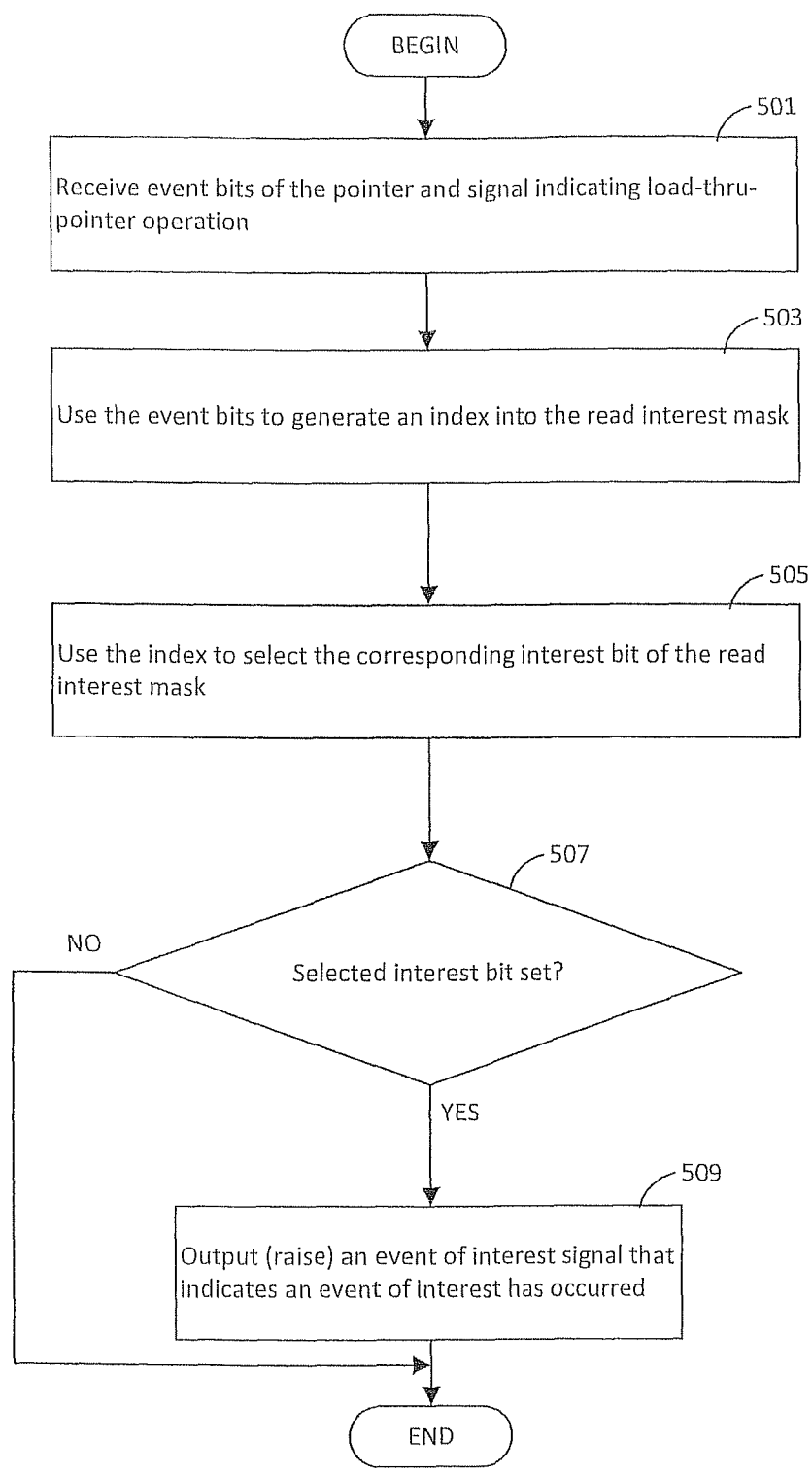
FIG. 5 is a flow chart that illustrates exemplary operations carried out by the pointer event detector block of FIG. 4 in conjunction with the processing a load-thru-pointer operation.

For the case where the execution logic is executing a load-thru-pointer operation, the pointer event detector 407 can be configured to perform the following operations as illustrated in FIG. 5.

The operations begin in block 501 where the pointer event detector 407 is supplied with the event bits of a pointer along with a signal indicting execution of a load-thru-pointer operation.

In block 503, the event bits of the pointer as supplied to the pointer event detector in block 501 are used to generate an index into the read interest mask 405A.

In block 505, the index generated in block 503 is used access the read interest mask 405A and select a corresponding interest bit of the read interest mask 405A.

In block 507, the pointer event detector 407 processes the interest bit selected in block 505 to determine if the selected interest bit is set. If so, the operations continue to block 509 where the pointer event detector 407 outputs (raises) raises an event-of-interest signal that indicates an event-of-interest has occurred and then the operations end. Otherwise (the selected interest bit is not set), the operations end without raising the event-of-interest signal.

Figure 6:
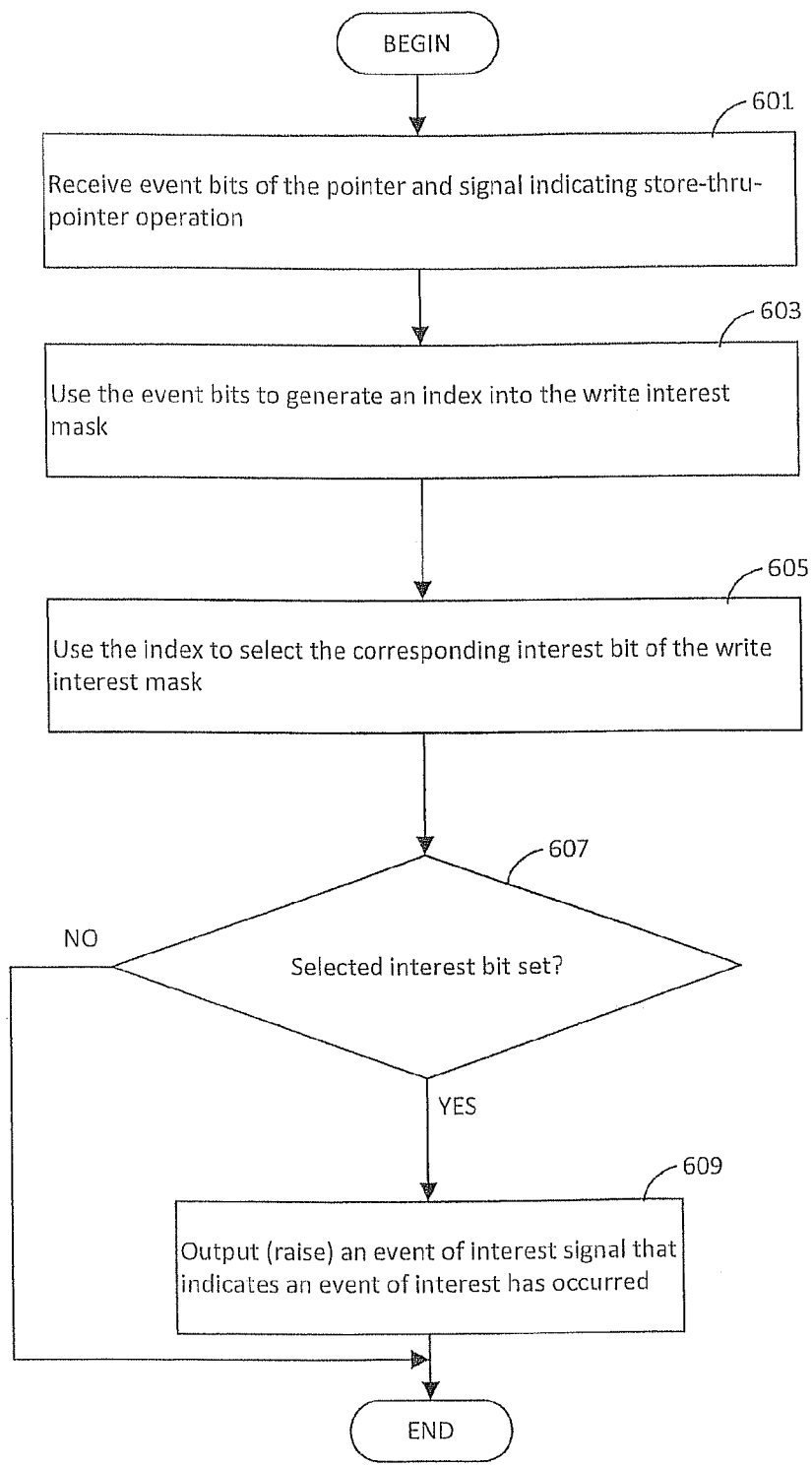
FIG. 6 is a flow chart that illustrates exemplary operations carried out by the pointer event detector block of FIG. 4 in conjunction with the processing a store-thru-pointer operation.

For the case where the execution logic is executing a store-thru-pointer operation, the pointer event detector 407 can be configured to perform the following operations as illustrated in FIG. 6.

The operations begin in block 601 where the pointer event detector 407 is supplied with the event bits of a pointer along with a signal indicting execution of a store-thru-pointer operation.

In block 603, the event bits of the pointer as supplied to the pointer event detector in block 601 are used to generate an index into the write interest mask 405B.

In block 605, the index generated in block 603 is used access the write interest mask 405B and select a corresponding interest bit of the write interest mask 405B.

In block 607, the pointer event detector 407 processes the interest bit selected in block 605 to determine if the selected interest bit is set. If so, the operations continue to block 609 where the pointer event detector 407 outputs (raises) raises an event-of-interest signal that indicates an event-of-interest has occurred and then the operations end. Otherwise (the selected interest bit is not set), the operations end without raising the event-of-interest signal.

Figure 7:
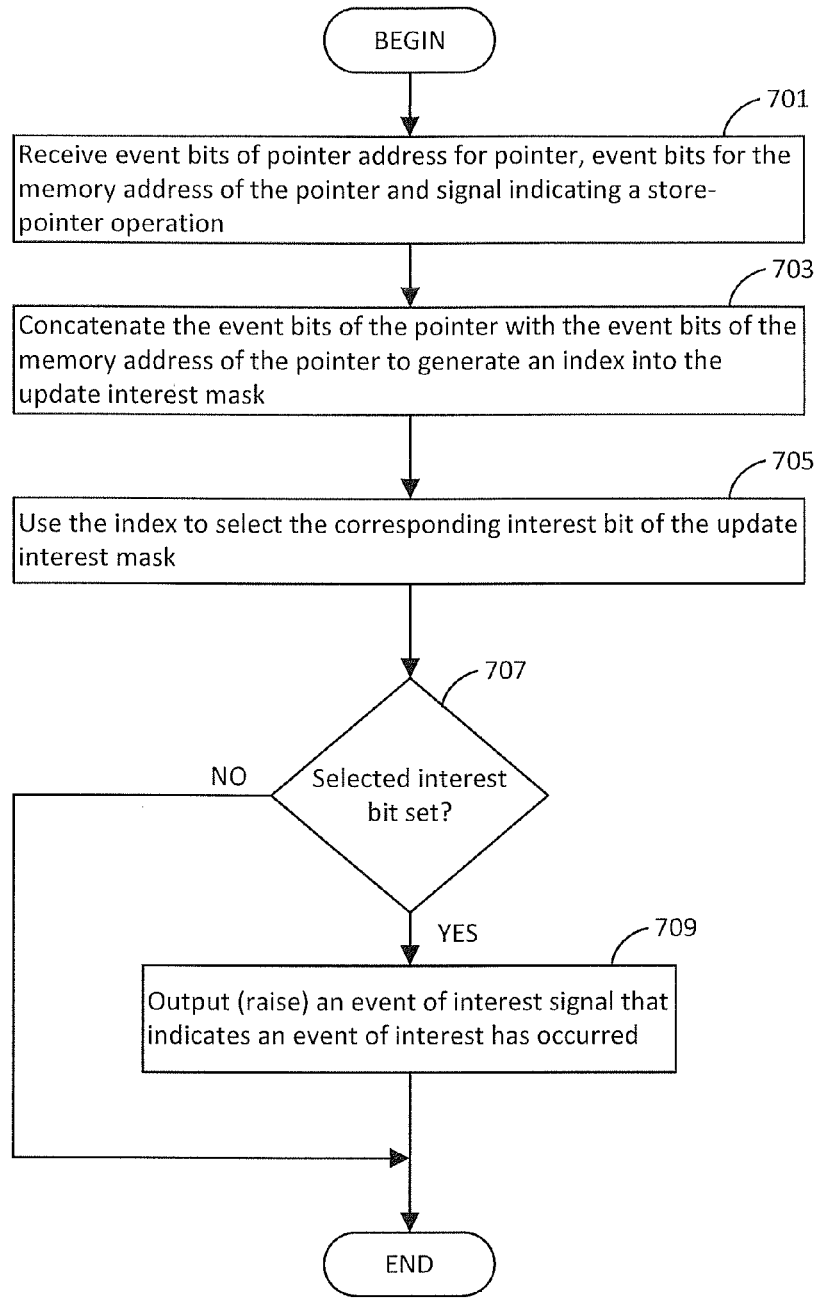
FIG. 7 is a flow chart that illustrates exemplary operations carried out by the pointer event detector block of FIG. 4 in conjunction with the processing a store-pointer operation that updates a pointer from an old memory address to a updated memory address.

For the case where the execution logic is executing a store-pointer operation, the pointer event detector 407 can be configured to perform the following operations as illustrated in FIG. 7.

The operations begin in block 701 where the pointer event detector 407 receives the event bits of the pointer address being written to, the event bits of the pointer being written, and a signal indicting execution of a store-pointer operation from the address generation unit 403.

In block 703, the event bits of the pointer address being written to are concatenated with the event bits of the pointer being written in order to generate an index into the update interest mask 405C. In concatenating the event bits, the event bits of the address being written to define the most-significant bits of the concatenated result and the event bits of pointer being written define the least-significant bits of the concatenated result. The concatenated bits of the result are treated as an integer value which forms the index.

In block 705, the index generated in block 703 is used access the update interest mask 405C and select a corresponding interest bit of the update interest mask 405C.

In block 707, the pointer event detector 407 processes the interest bit selected in block 705 to determine if the selected interest bit is set. If so, the operations continue to block 709 where the pointer event detector 407 outputs (raises) raises an event-of-interest signal that indicates an event-of-interest has occurred and then the operations end. Otherwise (the selected interest bit is not set), the operations end without raising the event-of-interest signal.

The access to the three mask registers 405A, 405B and 405C can be controlled as desired.

In one embodiment, an operating system executes on the computer processing system. The operating system includes a run-time system that includes a garbage collection routine (garbage collector). The garbage collector is a form of automatic memory management in that it attempts to reclaim memory occupied by objects that are no longer in use by the program. Use of pointers is tracked by the garbage collector to locate memory objects that no longer have any pointers leading to them, which thereupon may be scavenged and the memory returned to the pool of available memory for use by other objects. In the usual method of implementation, garbage collection is performed by a different thread or process (the collector) than the program itself (the mutator).

In this embodiment, the three mask registers 405A, 405B, 405C can be written to only by the run-time system of the garbage collector and not directly by other user-space programs and applications. The run-time system can write the interest bits of the mask registers 405A, 405B and 405C using a software protocol as deemed appropriate by the system designer. There is no requirement that the facility be used, and the interest bits of the mask registers can be zero unless explicitly set, so that events of interest are not raised unless explicitly arranged.

For example, consider a copying-type garbage collector with two regions, an old region and a new region. Allocation is out of the new region, until it fills, whereupon the garbage collector switches and the new region becomes the old region and allocation resumes from the former (empty) old region. In parallel with continued program execution, values are copied from old region (the former, now full, new region) to the new region. When all the live values are copied from old region, the old region is empty and is ready for the next switch. While the copying is happening, the program execution may utilize pointer addresses that point into the old region and can update values at those addresses before they get copied. The garbage collector wants the updates to be applied to the copy in the new region, or otherwise it may get lost.

The computer processing system is configured such that the old region and the new region are both assigned a unique combination of event bit values. Furthermore, the event bits for each pointer are set to indicate the region (old or new) of that pointer's target location. The update interest mask 405C is set such that any memory operation where a pointer to the old region is made to point to a location in the new region (an up-level reference) would be considered an event-of-interest, while other assignments (same-level or down-level references) would not be. The same-level reference case arises for any store-pointer operation where a pointer stored to the old region points to a location in the old region or where a pointer to the new region is made to point to a location in the new region. The down-level reference case arises for any store-pointer operation where a pointer stored to the new region points to a location in the old region.

Consider an example where the event bit count is three with the new region assigned event bit values of "001" binary or "1" in decimal and the old region assigned event bit values of "010" binary or "2" in decimal. In this example, a pointer to a target location in the old region would include the "old region" event bit values of "010" binary or "2" in decimal, and a pointer to a target location in the new region would include the "new region" event bit values of "001" binary or "1" in decimal. The update interest mask 405C is defined such that the interest bit indexed by a concatenated result of 17 in decimal (0x11 in hexadecimal) is set. This interest bit corresponds to the up-level reference assignment. In this case, because the indexed interest bit of the update interest mask 405C is set, the event-of-interest signal is raised. It is then possible for the collector to take extra steps necessary to properly carry out the up-level reference.

The update interest mask 405C can be further defined such that the interest bit indexed by a concatenated result of 18 in decimal (0x12 in hexadecimal) is cleared. This interest bit corresponds to the old-old same-level reference assignment. The update interest mask 405C can also be defined such that the interest bit indexed by a concatenated result of 9 in decimal (0x09 in hexadecimal) is cleared. This interest bit corresponds to the new-new same-level reference assignment. The update interest mask can also be defined such that the interest bit indexed by a concatenated result of 10 in decimal (0x0a in hexadecimal) is cleared. This interest bit corresponds to the down-level reference assignment. In these cases, because the indexed interest bit of the update interest mask 405C is cleared, the event-of-interest signal is not raised. These operations allow both mutator (the program) and the collector to execute at full speed without software checking for up-level references.

Note that the particulars of the collecting scheme are described above are provided to illustrate an exemplary system. There are innumerable different garbage collecting schemes that can be adapted to employ the event detection hardware as described herein. Furthermore, the event detection hardware can be designed to be a flexible general-purpose support that can be used in many different ways to improve the desired garbage collecting routine as it does not dictate any particular style of garbage collection. It is also contemplated that the event detection hardware can be used in other applications where pointers must be tracked.

Pointer Check Processing

Modern high level programming languages support the use of pointers. The C programming language permits arbitrary creation and manipulation of pointers, which can be the source for wild-address bugs. For example, a pointer can be made to address a location that does not contain program data, or contain different data than the logic of the program expects. When the incorrect pointer is dereferenced to access the pointed-to location, the result may be incorrect program execution or even system crash. Hardware paging and protection may detect some of these errors, but the granularity of detection is very large and many bugs are not detected. Certain programming languages, such as Java, are immune to pointer wild addresses. In these languages, all changes to a pointer value are explicitly checked for consistency with the program model and will raise an exception if the check fails. Such checks can also be applied manually in languages like C. However, the checks have cost in execution time and program and data space, and are eschewed by many programmers.

The general form of a pointer check presumes that the target of a pointer is a single program object, frequently an array, and that a valid pointer will always refer to a location within the address range occupied by the object. Hence, checking commonly requires retaining the least and greatest addresses of the occupied range, and verifying that subsequent pointer manipulation does not cause the pointer to exceed those bounds. This system is simple and general, but triples the data required for a checked pointer over that for an unchecked pointer, and the check itself can add several instructions at each point the pointer is used. Also note that the range check does not catch errors due to misaligned pointers within the range.

This aspect of the present disclosure describes a hardware circuit for creating a new pointer derived from a base pointer argument and simultaneously performing a pointer check operation in order to determine whether the calculated address of the derived pointer is within the allowed address range for object referenced by the base pointer. Note that the operation of the hardware circuit is not completely general, because the allowed address range for the pointer is required to be a naturally-aligned space of power-of-two size. However, in practice allocators for power-of-two spaces are simple and cheap, and the waste space arising from rounding allocations up to power-of-two boundaries can be reused for other purposes.

According to this aspect of the present disclosure, the physical representation of each pointer includes a small number of reserved bits (called "a granularity field") that are associated with the pointer. The reserved bits of the granularity field are taken from the bits used as the address of the pointer, thereby reducing the address range of the pointer. Consider, without loss of generality, a computer processing system that employs 64-bit addresses. The 64 bits of the address for a pointer can be partitioned into two parts as shown in FIG. 8, including: i) a granularity field of six bits in size, and ii) an address field defined by the remainder fifty-eight bits, which represents the actual address location.

The reduced size of the address part reduces the size of the potential address space from $2^{64}$ to $2^{58}$, which is unimportant in practice on modern CPUs. Furthermore, the value of the granularity field is interpreted as specifying how many of the address bits are to be interpreted as comprising the offset field, with the remaining address bits interpreted as comprising the chunk field. Thus, the value of the granularity field splits the address field into two parts as shown in FIG. 8, including: i) a chunk address for the most-significant part of the address field, and ii) an offset within the chunk for the least-significant part of the address field. The chunk address identifies a chunk of a number of bytes. The offset identifies a byte within the chunk. The actual address is the concatenation of the chunk address and offset fields. Note that in one embodiment each chunk has a power-of-two size and natural alignment as a consequence of the representation used.

The number of bits of the address field that make up the offset (which dictates the number of bytes in the chunk) along with the number of bits of the address field that make up the chunk address (which dictates the number of possible chunks) vary according to a predefined schema, and such configuration is identified by the value of the bit field. In the predefined schema, the value of the granularity number tracks the granularity of the offset part of the address and is used to identify whether a derived pointer refers to the start of the same object (as indicated by the chunk) as a base pointer and hence is permitted (or else lies outside the base object and hence is in error and thus will be prohibited and raise a fault).

Figure 8:
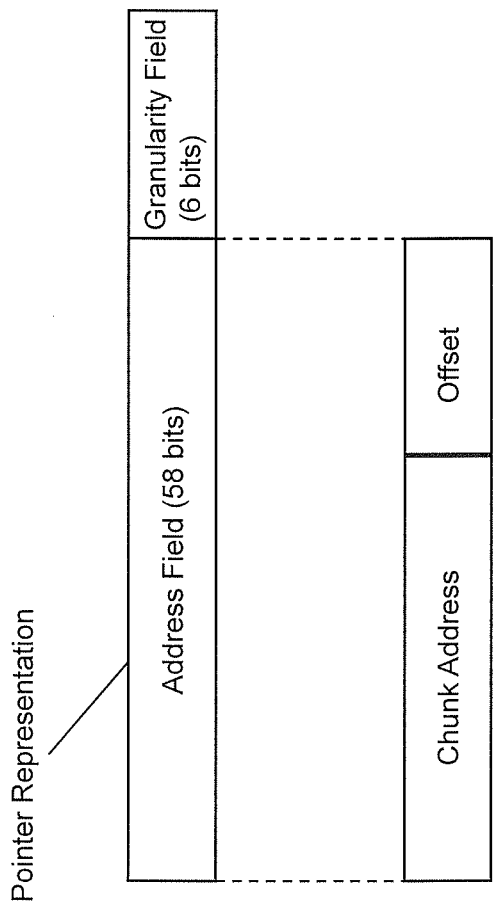
FIG. 8 is schematic illustration of a representation of a pointer in memory according to a second aspect of the present disclosure.

This schema can be explained considering the exemplary 64-bit address of FIG. 8.

For a granularity field whose value is one, the least significant bit of the address field comprises the offset and the most significant fifty-seven bits of the address field comprise the chunk address. In this case, each chunk is two bytes. The fifty-seven chunk address identifies a particular chunk. The single bit offset identifies a byte within the two byte chunk. In this case, the granularity of the offset part of the address is two bytes. Derivation of a pointer based on such a pointer is permitted so long as the chunk field of the derived and base pointers are the same, while the derived pointer may have any offset value. A derived pointer that has a different value in the chunk field that the base pointer from which it was derived, regardless of the offset values, would refer outside the object indicated by the base pointer and hence will be prohibited and raise a fault.

For a granularity field whose value is two, the least significant two bits of the address field comprises the offset and the most significant fifty-six bits of the address field comprise the chunk address. In this case, each chunk is four bytes. The fifty-six bit chunk address identifies a particular chunk. The two bit offset identifies a byte within the four byte chunk. In this case, the granularity of the offset part of the address is four bytes. A derived pointer which differs from the base pointer solely in the two-bit offset field is permitted because it refers to (a different part) of the base object, but a derived pointer that differs from the base pointer in the chunk field refers outside the base object and reflects an error and thus will be prohibited and raise a fault.

For a granularity field whose value is three, the least significant three bits of the address field comprise the offset and the most significant fifty-five bits of the address field comprise the chunk address. In this case, each chunk is eight bytes. The fifty-five bit chunk address identifies a particular chunk. The three bit offset identifies a byte within the eight byte chunk. In this case, the granularity of the offset part of the address is eight bytes. A derived pointer which differs from the base pointer solely in the three-bit offset field is permitted because it refers to (a different part) of the base object, but a derived pointer that differs from the base pointer in the chunk field refers outside the base object and reflects an error and thus will be prohibited and raise a fault.

This can be extended further to provide offset part granularities of sixteen bytes for the granularity field value being four, thirty-two bytes for the granularity field value being five, sixty-four bytes for the granularity field value being six, etc.

Note that a granularity field value of zero can be interpreted as an offset field granularity of one byte, which means that any attempt to derive a pointer to something else is in error and thus will be prohibited and raise a fault.

Figure 9:
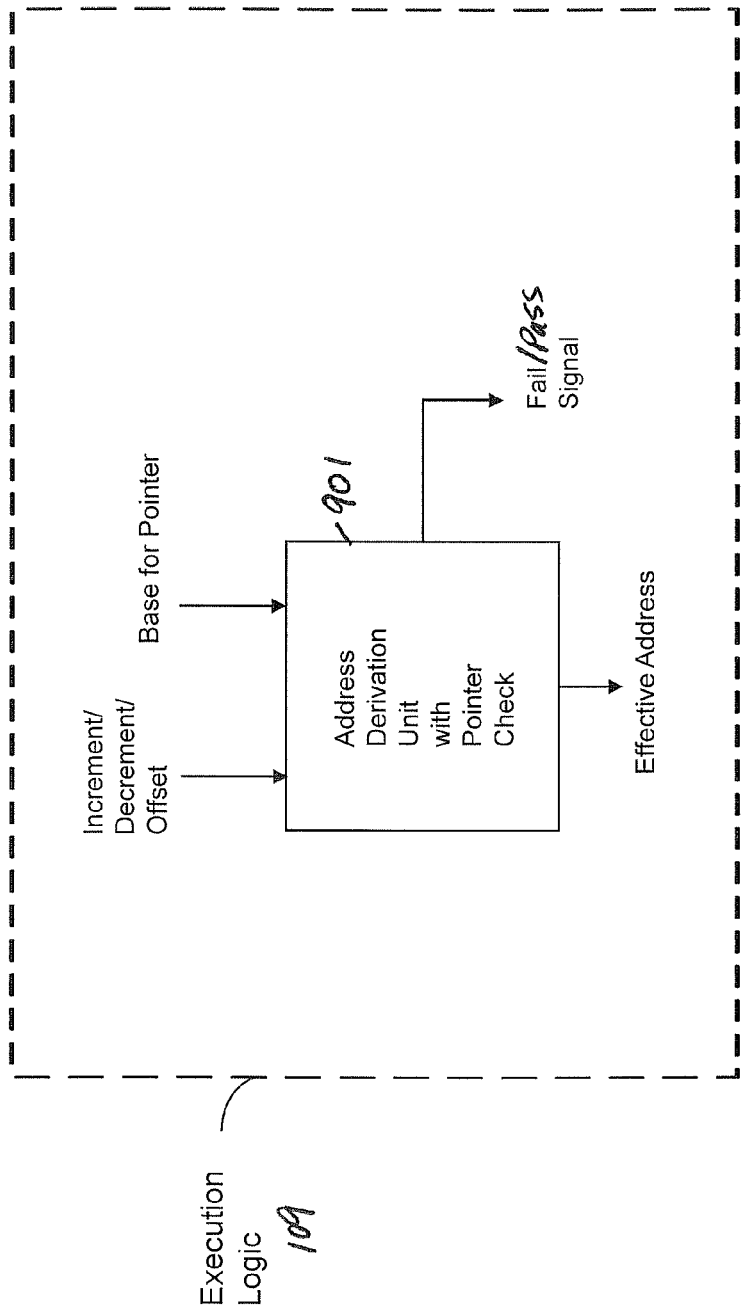
FIG. 9 is schematic illustration of components that can be part of the execution logic of the computer processor of FIG. 1 in carrying out a hardware-based pointer check operation according to an embodiment of the second aspect of the present disclosure.

FIG. 9 shows an exemplary embodiment where the execution logic 109 of the CPU includes an address derivation unit 901 that is configured to derive pointer effective addresses (i.e., the memory addresses pointed to by respective pointers) that are used by the program(s) executing on the CPU 102. It is contemplated that the address derivation unit 901 can be a functional unit dedicated to addressing arithmetic or can possibly perform other integer operations, including integer arithmetic on pointer-sized numbers. In the context of the embodiment of FIG. 9, the need for the specialized pointer processing mandates that the instruction set architecture of the CPU be defined to identify any operation that can potentially derive a new pointer from a given base pointer, including such derivation that is implicit in the address modes of memory-reference operations. The semantics of such pointer operation is used to configure the address derivation unit 901 such that it is used to derive the new pointer and simultaneously perform a pointer check operation in order to determine whether the calculated derived pointer address is within the allowed address range for the pointed-to base object.

As shown in FIG. 9, the address derivation unit 901 is supplied with a base address signal as well as a signal representing a displacement relative to the base address. The base address signal is a pointer itself. A typical pointer manipulation operation is to increment a pointer's address to refer to a successor element in an array. The increment involves adding a small constant equal to the size of the array element to the current base address signal of the pointer. In this case, the displacement signal corresponds to the size of the array element. Another typical pointer manipulation operation is to decrement a pointer's address to refer to a predecessor element in an array. The decrement involves subtracting a small constant equal to the size of the array element to the current base address signal of the pointer. In this case too, the displacement signal corresponds to the size of the array element. The displacement signal of the pointer for pointer operations can also be defined by the value stored in a special scale register in scaled indexed addressing. There are other possible pointer manipulation operations that operate in some manner relative to a base address.

In execution, the address derivation unit 901 extracts the reserved meta-data bits of the granularity field of the base address signal of the pointer and utilizes the granularity field of the base address signal to determine the granularity of the offset part of the base address signal according to the predefined schema. The address generator unit 901 is then configured to generate the pointer effective address according to the base address signal and the displacement signal (typically by adding them together, possibly with scaling) while checking for an offset part overflow condition in calculating the offset part of the resulting pointer effective address. In calculating the address field of the pointer effective address, the reserved meta-data bits of the base address signal are not part of the addressing arithmetic calculation.

During both pointer increment and pointer decrement operations, the offset part overflow condition is detected when the address field of the resulting pointer address differs from the address field of the base address beyond the offset part of the resulting pointer address. When the address field of the resulting pointer address differs from the address field of the base address only in the offset part of the resulting pointer address, there is no offset part overflow condition. Note that the size (the number of bits) of the offset part of the resulting pointer address is dictated by the granularity field of the base address signal and the predefined schema. The base signal of the given pointer can be supplied by operand storage (such as a register or belt). The index signal can also be supplied by operand storage (such as a register or belt) or possibly computed and output by a functional unit (including the address derivation unit 901 itself).

If the offset part overflow condition is detected, the derivation of the new pointer effective address is in error and the address derivation unit 901 outputs a fail signal. No valid pointer address is output. Furthermore, a fault can be raised unless flagged as a special operation as described later.

If no offset part overflow condition is detected, the address derivation unit 901 outputs a valid pointer effective address along with a pass signal. The address field of the pointer address is constructed from the addressing arithmetic of the address field of the base address signal and the displacement signal. The meta-data reserved bits of the base address, including the granularity field, are copied into the pointer effective address. In this case, the resulting pointer effective address is valid and can be used by the execution of the program as dictated by the program.

Thus, any derivation of a pointer that changes only the offset part of the base address signal of the pointer is deemed safe and correct, while any operation (other than certain special operations as described later) that modifies the chunk field of the base address of the pointer is deemed unsafe and incorrect. Thus pointer manipulation within a chunk is permitted, while manipulation across chunks is not.

It is common that the mechanism that supports the address generation for pointer derivation operations is also used for computing effective addresses in load, store, load-effective-address, and other operations in which an address is derived from but not identical to a pointer. However, all these operations presume an initial pointer whose target address is being modified. In any event, the computer processor provides a means by which a pointer may be constructed. Typical means include conversion between integer and pointer, and construction from a literal value contained in the program; both these operations are likely to be implicit (requiring no code) except on architectures in which data is identified by type at run time.

The instruction set architecture of the processor can also support a "Refine" operation that allows a program to decrement the granularity number field of a pointer, checking for underflow. The effect of this is to leave the pointer referring to the same byte address (the concatenated chunk and offset bits are unchanged, although the chunk field is larger and the offset smaller), but the size of the encompassing chunk is reduced for checking purposes. The instruction set architecture of the processor can also support the inverse operation which increments the granularity number field. Such an operation is inherently risky (the range of memory within which the pointer is deemed to be valid is increased), but may be of use in allocators.

If the target datum of the pointer is not itself of a natural power-of-two size, then the chunk part of the memory address of the pointer referring to it must be larger than the object itself; the excess may lie in front of the object, behind it, or both. Moving the pointer from the object into these excess regions will be an undetected error in the present disclosure. It is most common for programs to step through arrays in increasing-address order, so placing the excess in front of the object (with no excess after it) is more likely to catch array overruns than other arrangements would.

Operations that use pointers but do not modify them can be aware of but ignore the granularity number field. Thus relational operations, which detect whether a pointer refers to the same location as another pointer, or to a greater or lesser address, can be configured to compare the concatenated chunk and address regardless of the bit number. Similarly, the delta (pointer difference) operation, which determines the byte distance from one address to another, can be configured to subtract only the concatenated chunk and offset, and ignore the granularity fields. Alternatively, certain programming languages define that pointers may only be compared or differenced when their addressed locations lie within a single object, typically an array. In such a case, the relational and difference operations may be configured to check the granularities of the pointer arguments and confirm that the address indicated by both lies within the larger of the chunks indicated by the granularities. The CPU may offer both checking and non-checking forms of these operations.

Any program manipulation that leaves a pointer referring within the same object as it did before the manipulation is by definition valid. However, the C++ language also defines that a pointer may validly refer to one element beyond an array, outside of the addressed object, but only by one element size, and the result must not be dereferenced. If the object is of less than power-of-two size this language requirement can be accommodated by having the allocator place the object one element from the end of the chunk. In this case, the address derivation unit 901 can be configured to allow a pointer to be incremented to the last-plus-one position of the array and will consider this position within the chunk and no offset part overflow condition will be detected.

However, this stratagem is unavailable if the object is of exactly power-of-two size, because leaving space for the after-the-end position would wastefully force a chunk of double the natural size. Instead, this case can be addressed by defining a single "valid/invalid" bit in the pointer representation. When the valid/invalid bit is set for a given pointer, the pointer is interpreted as be valid. When the valid/invalid bit is cleared for a given pointer, the pointer is interpreted as be invalid. Valid pointers may be dereferenced normally, while attempts to dereference an invalid point result in an exception. Program actions to create a pointer (by conversion of a literal or an integer datum) produce a valid pointer. A pointer increment of a valid pointer that causes the chunk field to increment by one and the offset to become zero marks the valid/invalid bit of the pointer as invalid without raising an exception. Operations on invalid pointers are restricted. Invalid pointers may be compared with valid or invalid pointers by relational operations without error, and the distance between an invalid pointer and another pointer may be determined, also without error. However address arithmetic (such as increment, decrement, or computing an effective address) on an invalid pointer must produce either the original invalid pointer unchanged, or a pointer into the chunk immediately previous to the one indicated by the invalid pointer, in which case the valid/invalid bit of the produced pointer is marked valid. These rules permit incrementing a pointer to the one-beyond-the-end position and then restoring it to refer within the original object, while preventing access to the past-the-end-position or to any wild address further on.

It will be evident that computer processors that utilize the operations of the address derivation unit with pointer checking as described herein will be able to detect many, but not all, program errors involving pointers. The data requirement is the same as for unchecked pointers and no extra code is required for the added safety. Latency of pointer derivation operations is not increased because the checking is simple and may be performed in parallel with the pointer derivation. Also note that erroneous pointer movements within the smallest power-of-two range encompassing the object are not caught, whereas they would be by the general solution. Hence, the operations of the address derivation unit with pointer checking as described herein may be considered to be an economical aid to debugging rather than a panacea for checking all pointer operations.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processor comprising:
at least one mask register that includes a number of interest bits whose values represent whether a possible event would be of interest if it did occur; and
execution logic that performs operations that utilize pointers stored in a memory system operably coupled to the computer processor;
wherein each pointer stores a value representing a memory address and is associated with a predefined number of event bits separate from the memory address value of the pointer;
wherein the execution logic is configured to process the interest bits stored in the at least one mask register and the event bits associated with a given pointer in conjunction with the processing of a predefined memory-related operation that involves the given pointer in order to selectively output an event-of-interest signal that provides an indication that an event-of-interest has occurred;
wherein the at least one mask register corresponds to at least one predefined class of memory-related operations;
wherein the event bits of the given pointer are used to generate an index into the mask register; and
wherein the index is used to access and select a corresponding interest bit of the mask register and then process the selected interest bit in order to selectively output the event-of-interest signal based upon the value of the selected interest bit.

2. A computer processor according to claim 1, wherein:
the at least one mask register includes a plurality of mask registers that correspond to different predefined classes of pointer-related operations, wherein each mask register includes a number of interest bits whose values represent whether an event-of-interest has occurred.

3. A computer processor according to claim 2, wherein:
the event bits of the given pointer are used to generate an index into a particular mask register, wherein the particular mask register corresponds to the pointer-related operation that involves the given pointer; and
the index is used to access and select a corresponding interest bit of the particular mask register and then process the selected interest bit in order to selectively output the event-of-interest signal based upon the value of the selected interest bit.

4. A computer processor according to claim 1, wherein:
the at least one mask register includes an update interest mask register that corresponds to a predefined class of pointer-related operations that store a pointer value to memory, wherein the update interest mask register-includes a number of interest bits whose values represent whether a possible event would be of interest if it did occur.

5. A computer processor according to claim 4, wherein:
the event bits of a pointer being stored to and the event bits of a pointer being stored are concatenated to generate an index into the update interest mask register, and
the index is used to access and select a corresponding interest bit of the update interest mask register and then process the selected interest bit in order to selectively output the event-of-interest signal based upon the value of the selected interest bit.

6. A computer processor according to claim 5, wherein the event bits of the pointer being stored to define the most-significant bits of the concatenated result that forms the index, and the event bits of the pointer being stored define the least-significant bits of the concatenated result that forms the index.

7. A computer processor according to claim 6, wherein:
the concatenated bits of the result are treated as an integer value which forms the index.

8. A computer processor according to claim 4, wherein:
the instruction set architecture of the computer processor semantically defines the class of pointer-related operations that store a pointer value to memory in a manner that distinguishes such operations from store operations for storing an ordinary non-pointer data operand in memory.

9. A computer processor according to claim 4, wherein:
in order to support a garbage collecting scheme involving multiple regions of memory, the event bits of each respective pointer are updated to track a particular region of memory to which the respective pointer references.

10. A computer processor according to claim 1, wherein:
the at least one mask register includes a read interest mask register that corresponds to a predefined class of pointer-related operations that read memory through a pointer, wherein the read interest mask register includes a number of interest bits whose values represent whether a possible event would be of interest if it did occur.

11. A computer processor according to claim 1, wherein:
the at least one mask register includes a write interest mask register that corresponds to a predefined class of pointer-related operations that write memory through a pointer, wherein the write interest mask register includes a number of interest bits whose values represent whether a possible event would be of interest if it did occur.

12. A computer processor according to claim 1, wherein:
the event bits of the given pointer are set by the computer processor.

13. A computer processor according to claim 1, wherein:
the interest bits stored in the at least one mask register are written by an operating system garbage collector executing on the computer processor.

14. A computer processor according to claim 13, wherein:
the operating system garbage collector employs an old region and a new region;
the interest bits stored in the at least one mask register are set such that any memory operation where a pointer to an old region is made to point to a new region would be considered an event-of-interest;
the interest bits stored in the at least one mask register are set such that any memory operation where a pointer to an old region is made to point to an old region would not be considered an event-of-interest;
the interest bits stored in the at least one mask register are set such that any memory operation where a pointer to a new region is made to point to a new region would not be considered an event-of-interest; and
the interest bits stored in the at least one mask register are set such that any memory operation where a pointer to a new region is made to point to an old region would not be considered an event-of-interest.

15. A computer processor comprising:
execution logic that performs operations that utilize pointers stored in a memory system operably coupled to the computer processor;
wherein each pointer is represented by an address field and a granularity field, wherein address field includes a chunk address and an offset, and wherein the granularity field represents the granularity of the offset of the address field;
wherein the execution logic includes an address derivation unit that processes the granularity field for a given pointer in order to determine granularity of the offset of the address field for the given pointer, wherein the address derivation unit is configured to processes the granularity field of a base address of a pointer to determine the offset of the base address for the pointer and calculates a pointer effective address based on the base address of the pointer, the address derivation unit is further configured to check for an offset part overflow condition in calculating the pointer effective address, wherein the offset part overflow condition occurs when the address field of the effective address differs from the address field of a base address beyond the offset part of the pointer effective address, and the address derivation unit outputs a valid pointer effective address in the event that the offset part overflow condition is not detected.

16. A computer processor according to claim 15, wherein:
the address derivation unit outputs a fail signal in the event that the offset part overflow condition is detected.

17. A computer processor according to claim 15, wherein:
the instruction set architecture of the computer processor semantically defines a class of operations that utilize the address derivation unit to derive a new pointer from a given base pointer.

18. A computer processor according to claim 17, wherein:
the class of operations include pointer-increment operations and pointer-decrement operations, pointer indexing operations, pointer comparison operations, and pointer difference operations.

19. A computer processor according to claim 15, wherein:
the granularity field of a respective pointer can be updated by at least one predefined operation.

20. A computer processor according to claim 15, wherein:
a representation of a given pointer includes a valid bit that indicates whether the given pointer is valid or invalid.

21. A computer processor according to claim 20, wherein:
the address derivation unit is configured such that a derivation operation which produces a given pointer with an offset of zero and a chunk number one greater than that of the base pointer from which it is derived updates the valid bit of the given pointer to indicate that the pointer is invalid but does not indicate an exception.

22. A computer processor according to claim 20, wherein:
the computer processor is configured such that an attempt to dereference a given pointer with a valid bit that indicates that the given pointer is invalid generates an error.

23. A computer processor according to claim 20, wherein:
the address derivation unit is configured such that a derivation operation which produces a given pointer with a chunk number one less than that of an invalid base pointer from which it is derived updates the valid bit of the given pointer to indicate that the given pointer is valid and does not indicate an exception.

* * * * *